United States Patent [19]

Tanaka et al.

[11] Patent Number: 4,982,270
[45] Date of Patent: Jan. 1, 1991

[54] VIDEO DATA TRANSMITTING SYSTEM

[75] Inventors: Mitsugu Tanaka, Atsugi; Akio Aoki, Tokyo, both of Japan

[73] Assignee: Canon Kabushiki Kaisha, Tokyo, Japan

[21] Appl. No.: 305,548

[22] Filed: Feb. 3, 1989

[51] Int. Cl.⁵ .............................................. H04N 11/04
[52] U.S. Cl. ...................................................... 358/13
[58] Field of Search ........................... 358/13, 12, 138; 375/25

[56] References Cited

U.S. PATENT DOCUMENTS

| | | | |
|---|---|---|---|
| 2,949,505 | 8/1960 | Kretzmer | 375/25 |
| 4,633,296 | 12/1986 | Cham | 358/138 |
| 4,656,500 | 4/1987 | Mori | 358/13 |
| 4,716,453 | 12/1987 | Pawelski | 358/13 |
| 4,797,729 | 1/1989 | Tsai | 358/13 |

FOREIGN PATENT DOCUMENTS

| | | | |
|---|---|---|---|
| 0109086 | 8/1980 | Japan | 358/13 |
| 0109087 | 8/1980 | Japan | 358/13 |
| 8604759 | 8/1986 | World Int. Prop. O. | 358/13 |

*Primary Examiner*—John W. Shepperd
*Attorney, Agent, or Firm*—Fitzpatrick, Cella, Harper & Scinto

[57] ABSTRACT

There is provided a data transmitting system for digitizing color video data and transmitting, in which one picture plane is divided into a plurality of picture planes, every area corresponding to n (n is an integer 2 or more) luminance signal blocks as a unit for block encoding of a luminance signal and also corresponding to m (m is an integer less than n) chrominance signal blocks as a unit for block encoding of a chrominance signal, and the luminance signal and chrominance signal included in each area are respectively block encoded and are included in the same sync block and transmitted.

19 Claims, 2 Drawing Sheets

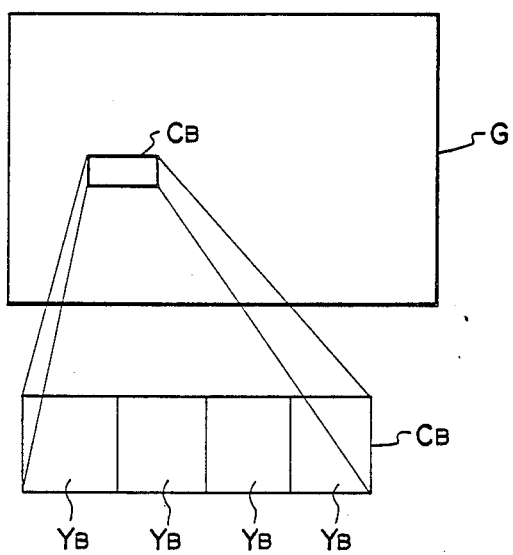

VIDEO DATA TRANSMITTING SYSTEM

BACKGROUND OF THE INVENTION

1. Field of the Invention

The present invention relates to a video data transmitting system and, more particularly, to a video data transmission system in which data is band compressed by means of what is called a block encoding and is transmitted.

2. Related Background Art

In a system in which a color television signal is separated into a luminance signal and a chrominance signal and digitized and transmitted, in general, a data sync block consisting of one sync signal pattern, the luminance signal, the chrominance signal, and a parity indication for detection of data errors is transmitted as a unit. The television signal of one field or one frame is divided and transmitted on such a sync block unit basis. In the television signal, the band of the chrominance signal is m/n (m<n; m and n are positive integers) times that of the luminance signal and the data amounts of the luminance signal and chrominance signal are set to ratio n:m. In consideration of this fact, in the conventional transmitting system, the data amounts of the luminance signal and chrominance signal included in one sync block have been set to ratio n:m so that both the luminance signal and the chrominance signal of the corresponding picture plane portion can be reproduced from one sync block on the receiving side (reproducing side).

However, in the system for transmitting data on a sync block unit basis as mentioned above, the data amount in the sync block depends on a data length of each sync block and is determined by the probability of detection of the sync block upon reproduction and the size of area corresponding to one sync block on the reproducing picture plane. That is, when the detection probability of the sync block is low because of the quality of the transmission path, the data amounts of the luminance signal and chrominance signal in the sync block are set to small values so as not to increase interference which is exerted on the reproducing picture plane.

In recent years, as a highly efficient band compressing system of a television signal, what is called a block encoding method of encoding all pixels constructing a picture plane on a unit basis of a pixel block consisting of a plurality of pixels has been proposed. For instance, such a block encoding method has been also proposed in U.S. patent applications which have been recently filed by the assignee of the present invention. However, in the conventional construction of the sync block, no consideration is given to the above block encoding method and such a construction is improper for the block encoding method.

SUMMARY OF THE INVENTION

It is an object of the present invention to solve the problems mentioned above.

Another object of the invention is to provide a data transmitting system which can transmit a good image and can easily perform the needed signal processing on the receiving side in an apparatus which compresses data by means of a block encoding.

To accomplish such objects, according to the present invention, as one embodiment, there is disclosed a video data transmitting system comprising: (a) first block encoding means for encoding a luminance signal on a unit basis of an encoding block consisting of a plurality of pixels; (b) second block encoding means for encoding a chrominance signal on a unit basis of an encoding block consisting of a plurality of pixels, a ratio of a sampling frequency of the luminance signal and a sampling frequency of the chrominance signal being set to the ratio n:m (n and m are positive integers and m<n); (c) time sharingly multiplexing means for time sharingly multiplexing the encoded luminance signal encoded by the first block encoding means and the encoded chrominance signal encoded by the second block encoding means; (d) sync signal adding means for adding a sync signal to the signal time sharingly multiplexed by the time sharingly multiplexing means and for forming a sync block, the sync block including the encoded luminance signals of n encoding blocks, the encoded chrominance signals of m encoding blocks, and one continuous sync signal train; and (e) transmitting means for transmitting the signal to which the sync signal was added by the sync signal adding means.

The above and other objects and features of the present invention will become apparent from the following detailed description with reference to the accompanying drawings.

BRIEF DESCRIPTION OF THE DRAWINGS

FIG. 2, consisting of FIGS. 2-1 through 2-4 is a diagrammatical view for explaining the operation of the circuit in FIG. 1; and FIG. 3 is a diagram showing areas on a picture plane which are occupied by a luminance signal and a chrominance signal.

DETAILED DESCRIPTION OF THE PREFERRED EMBODIMENT

Figure 1:
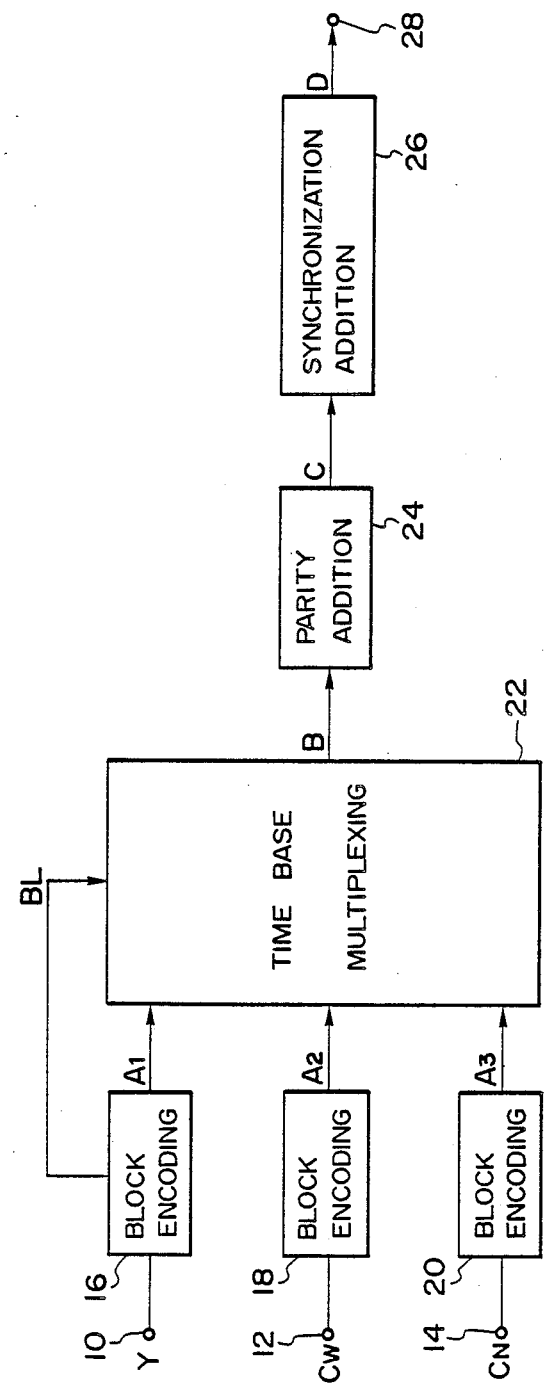
FIG. 1 is a block diagram showing a schematic construction of a sync block forming circuit as a main section in a data transmitting system as an embodiment of the present invention.

An embodiment of the present invention will be described hereinbelow with reference to the drawings.

FIG. 1 is a block diagram showing a schematic construction of a sync block forming circuit in a transmitting system as an embodiment of the invention. A luminance signal Y is input to an input terminal 10 and color difference signals $C_W$ and $C_N$ are input to input terminals 12 and 14. The ratio of the sampling frequencies of the luminance signal Y and color difference signal $C_W$ and the ratio of the sampling frequencies of the luminance signal Y and the color difference signal $C_N$ are both set to n:m. Block encoding circuits 16, 18, and 20 divide the input signals at the input terminals 10, 12, and 14 into pixel blocks (encoding blocks) each consisting of a predetermined number of pixels and perform the block encoding on every pixel block by a well-known method. A time base multiplexing circuit 22 multiplexes on the time base the luminance signal block from the block encoding circuit 16 and the chrominance signal blocks from the block encoding circuits 18 and 20. Practically speaking, a buffer memory in the time base multiplexing circuit 22 is controlled by a block generation signal BL from the block encoding circuit 16, which will be explained hereinlater, and the luminance signal block and the color signal block are time base multiplexed to n:m.

The block generation signal BL is a timing signal indicating that the encoded data of one block has been output from the luminance signal block encoding circuit 16. The multiplexing circuit 22 counts the block generation signals BL and multiplexes the luminance signal and the chrominance signal and outputs the multiplexed signal consisting of a predetermined number of (for instance, n) luminance signals and a predetermined number of (e.g., m) chrominance signals (n and m are positive integers).

A parity addition circuit 24 adds a parity for error correction to the output of the multiplexing circuit 22. A synchronization addition circuit 26 adds a sync signal to an output of the parity addition circuit 24. Thus, a sync block is completed and is output to a modulator for a transmission path or the like from an output terminal 28.

FIG. 2 shows a code arrangement at each stage in FIG. 1 in the case where n:m is set to 4:1. That is, $A_1$, $A_2$, and $A_3$ in FIG. 2-1 indicate outputs of the block encoding circuits 16, 18, and 20, respectively. B in FIG. 2-2 denotes an output of the time base multiplexing circuit 22. C in FIG. 2-3 represents an output of the parity addition circuit 24. D in FIG. 2-4 shows an output of the sync addition circuit 26, that is, one sync block. Y in $A_1$ indicates a code train in which the luminance signals of one pixel block have been block encoded. $C_N$ and $C_W$ in $A_2$ and $A_3$ represent code trains in which the color difference signals $C_N$ and $C_W$ of one pixel block have been block encoded, respectively. The ratio of the numbers of blocks per unit time of $A_1$, $A_2$, and $A_3$ is set to 4:1. $C_W/C_N$ in FIG. 2-2 denotes the time base multiplexed signal of $C_W$ and $C_N$ in FIG. 2-1. P in FIG. 2-3 indicates a parity code train and S in FIG. 2-4 represents a sync signal train.

In FIG. 3, G denotes the whole area of a picture plane; $Y_B$ indicates an area on the picture plane which is occupied by the pixel blocks (encoding blocks) of the luminance signal; and $C_B$ is an area on the picture plane which is occupied by the pixel blocks (encoding blocks) of the color difference signals $C_W$ and $C_N$. The color difference signals $C_W$ and $C_N$ (of one pixel block, respectively) in the area $C_B$ and the luminance signals (of four pixel blocks) in the common area $C_B$ are included in one sync block in FIG. 2-4.

The case where n:m=4:1 has been described as an example here. However, n and m are not limited to these values but can be arbitrarily set.

As an example of application of the invention, the case of what is called a digital VTR will now be considered. In the case of the VTR, when performing a special playback such as a search mode, envelopes of output signals from heads decrease at a predetermined period as compared with those in the normal playback mode. Therefore, the error detection is performed on a sync block unit basis instead of a pixel unit basis. The sync block in which errors are detected is interpolated using the other sync blocks having a high correlation. Therefore, in the VTR to which the invention is applied, since the luminance signal and the chrominance signal in the same whole area on a picture plane are included in the same sync block, errors in a certain sync block on an original picture plane hardly influence the areas corresponding to the other sync blocks. Thus, the interpolation unit used when errors occur can be reduced and the picture quality is improved. In the case where different sync blocks are formed on the picture plane with respect to the luminance signal and chrominance signal at the same position (area), for instance, when errors were generated in the sync block of the chrominance signal, even if the sync block of the luminance signal is correctly reproduced, the image signal is not correctly reproduced on the original picture plane.

As will be easily understood from the above description, according to the invention, since the luminance signals and chrominance signals corresponding to the whole divided areas on the picture plane are included in the same sync block, the image of the corresponding area on the original picture plane can be completely reproduced by reproducing one sync block. Therefore, even if errors occur on the data transmission path, the errors influence only the picture plane area of a narrow rang for the reproduced picture plane and do not exert an influence on the other picture plane areas. On the other hand, since the luminance signals and chrominance signals of the picture plane area corresponding to one sync block are included, the reproduced signal can be easily processed.

What is claimed is:

1. A video data transmitting system comprising:
   (a) first input means for inputting a digital luminance signal;
   (b) second input means for inputting a digital color signal, a ratio of sampling frequency of said digital luminance signal and sampling frequency of said digital color signal being set to n:m (where n and m are positive integers and m<n);
   (c) first block encoding means for band compressing the digital luminance signal by encoding the digital luminance signal on a unit basis of an encoding block consisting of a predetermined number of pixels, to produce encoded luminance signals;
   (d) second block encoding means for band comprising the digital color signal by encoding the digital color signal on a unit basis of an encoding block consisting of said predetermined number of pixels, to produce encoded color signals;
   (e) sync signal producing means for producing a specific sync signal train having a specific bit pattern;
   (f) sync block forming means for forming sync blocks each of which comprises the encoded luminance signals of n encoding blocks, the encoded color signals of m encoding blocks and only one said specific sync signal train; and
   (g) transmitting means for transmitting data on a unit basis of the sync block.

2. A system according to claim 1, wherein a size on a picture plane of the encoding block of the digital color signal is (n/m) times as large as that of the digital luminance signal.

3. A system according to claim 2, wherein an area on the picture plane of the n encoding blocks corresponding to the encoded luminance signals included in one sync block coincides with an area on the picture plane of the m encoding blocks corresponding to the encoded color signals included in the sync block.

4. A system according to claim 3, wherein n=4 and m=1.

5. A system according to claim 1, further comprising parity producing means for producing parity code trains for error correction of the encoded luminance signals and the encoded color signals.

6. A system according to claim 5, wherein the sync block comprises the encoded luminance signals of n encoding blocks, the encoded color signals of m encoding blocks, one continuous parity code train, and one continuous sync signal train.

7. A system according to claim 1, wherein the digital color signal includes two kinds of color difference signals and a sampling frequency of each of the two kinds of color difference signal is (m/n) of that of the digital luminance signal.

8. A system according to claim 7, wherein each said sync block comprises the encoded luminance signals of n encoding blocks, the encoded color difference signals of two kinds of m encoding blocks, and only one said specific sync signal train.

9. A video data processing device, comprising:
(a) first input means for inputting a digital luminance signal;
(b) second input means for inputting a digital color signal;
(c) first block encoding means for band compressing the digital luminance signal by encoding the digital luminance signal on a unit basis of an encoding block consisting of a predetermined number of pixels, to produce encoded luminance signal;
(d) second block encoding means for band comprising the digital color signal by encoding the digital color signal on a unit basis of an encoding block consisting of said predetermined number of pixels, to produce encoded color signals;
(e) sync signal producing means for producing a specific sync signal train having a specific bit pattern; and
(f) sync block forming means for forming sync blocks each of which comprises the encoded luminance signal of n encoding blocks, the encoded color signals of m encoding blocks and only one said specific sync signal train, n and m being positive integers.

10. A device according to claim 9, wherein a size on a picture plane of the encoding block of the digital color signal is (n/m) times as large as that of the digital luminance signal.

11. A device according to claim 10, wherein an area on the picture plane of the encoding blocks corresponding to the encoded luminance signal included in one sync block coincides with an area on the picture plane of the m encoding clocks corresponding to the encoded color signals included in said sync block.

12. A device according to claim 11, wherein a ratio of a sampling frequency of the digital luminance signal and a sampling frequency of the digital color signal is set to n:m.

13. A device according to claim 11, wherein n>m.

14. A video data transmitting system, comprising:
(a) first input means for inputting a digital luminance signal;
(b) second input means for inputting a digital color signal, a ratio of sampling frequency of the digital luminance signal and sampling frequency of the digital color signal being set to n:m (where n and m are positive integers and m<n);
(c) first block encoding means for band compressing the digital luminance signal by encoding the digital luminance signal on a unit basis of an encoding block consisting of a predetermined number of pixels, to produce encoded luminance signal;
(d) second block encoding means for band comprising the digital color signal by encoding the digital color signal on a unit basis of an encoding block consisting of said predetermined number of pixels, to produce an encoded color signal;
(e) parity code producing means for producing a parity code train for error correction of the encoded luminance signals and the encoded color signals;
(f) parity block forming means for forming parity blocks each of which comprises the encoded luminance signals of n encoding blocks, the encoded color signals of m encoding blocks and only one said parity code train; and
(g) transmitting means for transmitting data on a unit basis of the parity block.

15. A device according to claim 14, wherein a size on a picture plane of the encoding block of the digital color signal is (n/m) times as large as that of the digital luminance signal.

16. A device according to claim 15, wherein an area on the picture plane of the n encoding blocks corresponding to the encoded luminance signals included in one sync block coincides with an area on the picture plane of the m encoding blocks corresponding to the encoded color signals included in the sync block.

17. A video data processing device, comprising:
(a) first input means for inputting a digital luminance signal;
(b) second input means for inputting a digital color signal;
(c) first block encoding means for band compressing the digital luminance signal by encoding the digital luminance signal on a unit basis of an encoding block consisting of a predetermined number of pixels, and for producing an encoded luminance signal;
(d) second block encoding means for band comprising the digital color signal by encoding the digital color signal on a unit basis of an encoding block consisting of said predetermined number of pixels to produce an encoded color signal;
(e) parity code producing means for producing parity code trains for error correction of the encoded luminance signals and the encoded color signals; and
(f) parity block forming means for forming parity blocks each of which comprises the encoded luminance signals of n encoding blocks, the encoded color signals of m encoding blocks and only one said parity code train, n and m being positive integers.

18. A device according to claim 17, wherein a size on a picture plane of the encoding block of the digital color signal is (n/m) times as large as that of the digital luminance signal.

19. A device according to claim 18, wherein an area on the picture plane of the n encoding blocks corresponding to the encoded luminance signals included in one sync block coincides with an area on the picture plane of the m encoding blocks corresponding to the encoded color signals included in the sync block.

* * * * *

UNITED STATES PATENT AND TRADEMARK OFFICE
CERTIFICATE OF CORRECTION

PATENT NO. : 4,982,270

DATED : January 1, 1991

INVENTOR(S) : MITSUGU TANAKA, ET AL.

It is certified that error appears in the above-identified patent and that said Letters Patent is hereby corrected as shown below: Title page:

ITEM [58] AND [56]

Insert --[30] FOREIGN APPLICATION PRIORITY DATA

Feb. 9, 1988 [JP] Japan .......... 63-028039--.

COLUMN 1

Line 23, "to ratio" should read --to the ratio--.
Line 27, "to ratio" should read --to the ratio--.

COLUMN 2

Line 31, "2-4 is" should read --2-4, is--.

COLUMN 4

Line 13, "rang" should read --range--.
Line 34, "compris-" should read --compress- --.

COLUMN 5

Line 20, "produce encoded" should read --produce an encoded--.
Line 21, "compris-" should read --compress- --.
Line 44, "clocks" should read --blocks--.
Line 63, "produce encoded" should read --produce an encoded--.

UNITED STATES PATENT AND TRADEMARK OFFICE
CERTIFICATE OF CORRECTION

PATENT NO. : 4,982,270
DATED : January 1, 1991
INVENTOR(S) : MITSUGU TANAKA, ET AL.

It is certified that error appears in the above-identified patent and that said Letters Patent is hereby corrected as shown below:

COLUMN 6

Line 1, "compris-" should read --compress- --.
    Line 38, "compris-" should read --compress- --.
    Line 45, "signals" (both occurrences) should read --signal--.
    Line 49, "signals" should read --signal--.
    Line 50, "signals" should read --signal--.

Signed and Sealed this

Eighteenth Day of August, 1992

Attest:

DOUGLAS B. COMER

*Attesting Officer*      *Acting Commissioner of Patents and Trademarks*